United States Patent
Katagi et al.

(10) Patent No.: US 12,116,451 B2
(45) Date of Patent: Oct. 15, 2024

(54) EPOXY RESIN, EPOXY RESIN COMPOSITION, EPOXY RESIN CURED PRODUCT AND COMPOSITE MATERIAL

(71) Applicant: SHOWA DENKO MATERIALS CO., LTD., Tokyo (JP)

(72) Inventors: Hideyuki Katagi, Tokyo (JP); Yuki Nakamura, Tokyo (JP); Kazumasa Fukuda, Tokyo (JP); Tomohiro Ikeda, Tokyo (JP); Lin Tian, Tokyo (JP); Kei Tougasaki, Tokyo (JP); Naoki Maruyama, Tokyo (JP); Yoshitaka Takezawa, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 124 days.

(21) Appl. No.: 17/598,305

(22) PCT Filed: Mar. 27, 2019

(86) PCT No.: PCT/JP2019/013363
§ 371 (c)(1),
(2) Date: Sep. 27, 2021

(87) PCT Pub. No.: WO2020/194601
PCT Pub. Date: Oct. 1, 2020

(65) Prior Publication Data
US 2022/0162374 A1 May 26, 2022

(51) Int. Cl.
| | |
|---|---|
| *C08G 59/14* | (2006.01) |
| *C08G 59/16* | (2006.01) |
| *C08G 59/24* | (2006.01) |
| *C08G 59/28* | (2006.01) |
| *C08G 59/30* | (2006.01) |
| *C08G 59/40* | (2006.01) |
| *C08G 59/50* | (2006.01) |
| *C08G 59/68* | (2006.01) |
| *C08L 63/00* | (2006.01) |

(52) U.S. Cl.
CPC ....... *C08G 59/1455* (2013.01); *C08G 59/245* (2013.01); *C08G 59/4064* (2013.01); *C08G 59/5033* (2013.01); *C08G 59/688* (2013.01)

(58) Field of Classification Search
None
See application file for complete search history.

(56) References Cited

U.S. PATENT DOCUMENTS

| | | | |
|---|---|---|---|
| 4,764,581 A | 8/1988 | Miiller et al. | |
| 5,270,406 A * | 12/1993 | Earls | C09K 19/3823 528/109 |
| 9,242,948 B2 * | 1/2016 | Asaumi | C08L 63/00 |
| 2003/0008979 A1 | 1/2003 | Suenaga et al. | |

FOREIGN PATENT DOCUMENTS

| | | | |
|---|---|---|---|
| CN | 107108856 A | 8/2017 | |
| CN | 108699217 A | 10/2018 | |
| JP | 2014-122337 A | 7/2014 | |
| JP | 2015-074750 A | 4/2015 | |
| JP | 2016113540 A | 6/2016 | |
| JP | 2017106034 A | 6/2017 | |
| WO | WO-02053621 A1 * | 7/2002 | ............. C08G 59/12 |
| WO | 2018173953 A1 | 9/2018 | |

OTHER PUBLICATIONS

Carfagna, Cosimo et al., "Liquid Crystalline Epoxy Resins Containing Binaphthyl Group as Rigid Block with Enhanced Thermal Stability", 1297 Macromolecular Chemistry and Physics, Department of Materials and Production Engineering, University of Naples, Naples, Italy, vol. 195, No. 7, Jul. 1, 1994, pp. 2307-2315.

* cited by examiner

*Primary Examiner* — Michael J Feely
(74) *Attorney, Agent, or Firm* — SOLARIS Intellectual Property Group, PLLC

(57) ABSTRACT

An epoxy resin includes a reaction product between: an epoxy compound having a mesogenic structure; and at least one selected from the group consisting of an aromatic hydroxycarboxylic acid having a carboxy group and a hydroxy group bonded to an aromatic ring and an aromatic dicarboxylic acid having two carboxy groups bonded to an aromatic group.

11 Claims, No Drawings

EPOXY RESIN, EPOXY RESIN COMPOSITION, EPOXY RESIN CURED PRODUCT AND COMPOSITE MATERIAL

TECHNICAL FIELD

The present disclosure relates to an epoxy resin, an epoxy resin composition, an epoxy resin cured product and a composite material.

BACKGROUND ART

In recent years, in conjunction with the trend towards energy conservation, materials used in the field of electronic materials, industrial equipment and aerospace have been shifting from ceramics, metals and the like to more lightweight resin materials.

In applying resin materials as alternative materials to metals, composite materials that include a resin material and an inorganic material such as a filler or a fiber in combination are generally used, since resin materials alone often fail to satisfy desired thermal resistance and strength. In particular, carbon fiber-reinforced plastics (CFRPs), which are a composite material in which carbon fibers and a resin are combined, are attracting attention as a potential material that can achieve both lighter weight and improved strength, and have recently been adopted for structural frameworks of airplanes.

In expanding the application of CFRPs to airplanes or the like, further improvement in strength, especially improvement in fracture toughness in opening mode (Gic), is desired. In view of this situation, use of reaction-curable resins, including epoxy resins, which are superior in terms of strength and thermal resistance as compared to thermoplastic resins, is being considered.

The fracture toughness in the opening mode can be drastically improved by using, for example, an epoxy resin having a mesogenic structure (for example, see Patent Document 1). This is presumably attributable to the intermolecular cohesion at the time of fracture, or in other words, extension of cracks can be suppressed owing to stress relaxation.

RELATED ART DOCUMENTS

Patent Documents

Patent Document 1: Japanese Patent Application Laid-Open (JP-A) No. 2014-122337

SUMMARY OF INVENTION

Technical Problem

However, even when conventional epoxy resins having a mesogenic structure are used, there remains room for improvement in the fracture toughness desired in applying CFRPs to airplanes and the like.

In view of the foregoing circumstances, the present disclosure is directed to providing an epoxy resin and an epoxy resin composition capable of manufacturing a cured product having excellent fracture toughness, an epoxy resin cured product, which is a cured product of the epoxy resin composition, and a composite material using the cured product.

Solution to Problem

Means for solving the above problems include the following embodiments.

(1) An epoxy resin, containing a reaction product between:
an epoxy compound having a mesogenic structure; and
at least one selected from the group consisting of an aromatic hydroxycarboxylic acid having a carboxy group and a hydroxy group bonded to an aromatic ring and an aromatic dicarboxylic acid having two carboxy groups bonded to an aromatic group.

(2) The epoxy resin according to (1), wherein the aromatic ring is a benzene ring or a naphthalene ring.

(3) An epoxy resin, containing at least one compound selected from the group consisting of the following General Formulae (E1) and (E2):

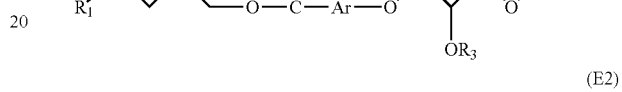

In General Formulae (E1) and (E2), Ar represents a substituted or unsubstituted aromatic ring; each of $R_1$ and $R_2$ independently represents a monovalent organic group having a glycidyl group, wherein at least one of $R_1$ or $R_2$ includes a mesogenic structure; and each $R_3$ independently represents a hydrogen atom or a monovalent organic group.

(4) The epoxy resin according to (3), wherein, in General Formulae (E1) and (E2), Ar represents a substituted or unsubstituted benzene ring or naphthalene ring.

(5) The epoxy resin according to (3) or (4), wherein, in General Formulae (E1) and (E2), at least one $R_3$ is a monovalent organic group of the following Formula (c):

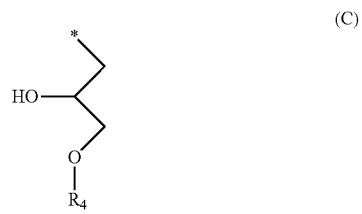

In Formula (c), $R_4$ represents a monovalent organic group; and * represents a bonding site to an oxygen atom.

(6) The epoxy resin according to any one of (1) to (5), wherein the mesogenic structure includes a structure represented by the following General Formula (M):

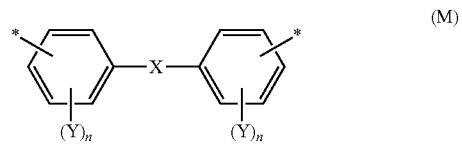

In General Formula (M), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom:

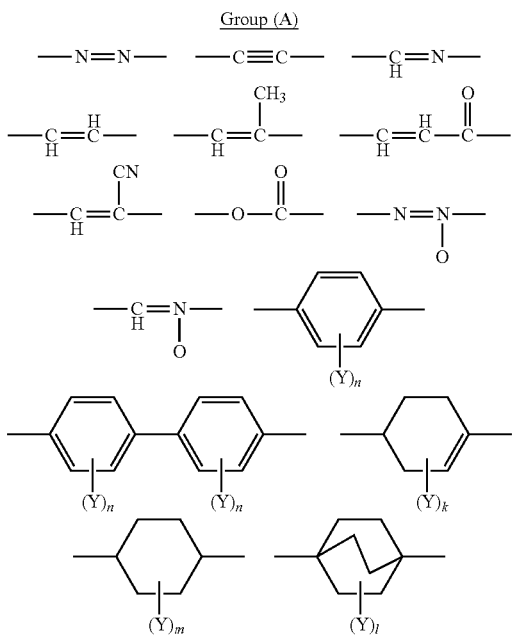

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

(7) The epoxy resin according to any one of (1) to (6), wherein the mesogenic structure includes a structure represented by the following General Formula (M-2):

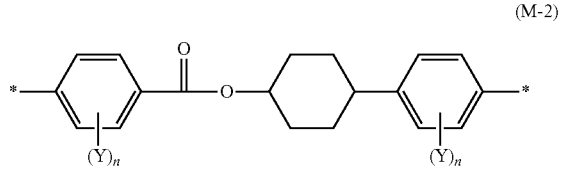

In General Formula (M-2), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

(8) The epoxy resin according to any one of (1) to (7), having an epoxy equivalent weight of from 300 to 380 g/eq.

(9). The epoxy resin according to any one of (1) to (8), having a melt viscosity at 100° C. of 2.0 to 50.0 Pa·s.

(10) The epoxy resin according to any one of (1) to (9), wherein a cured product of the epoxy resin cured by 3,3'-diaminodiphenyl sulfone, which is a curing agent, has a fracture toughness of 2.4 MPa·m$^{1/2}$ or more measured by three-point bend testing in accordance with ASTM D5045-14.

(11) The epoxy resin according to any one of (1) to (10), wherein a cured product of the epoxy resin cured by 3,3'-diaminodiphenyl sulfone, which is a curing agent, shows an interference pattern due to depolarization, when the cured product is observed with a polarized light microscope under crossed Nicols.

(12) An epoxy resin composition, containing the epoxy resin according to any one of (1) to (11) and a curing agent.

(13) An epoxy resin cured product, which is a cured product of the epoxy resin composition according to (12).

(14) A composite material containing the epoxy resin cured product according to (13) and a reinforcing material.

Advantageous Effects of Invention

According to the present disclosure, an epoxy resin and an epoxy resin composition capable of manufacturing a cured product having excellent fracture toughness, an epoxy resin cured product, which is a cured product of the epoxy resin composition, and a composite material using the cured product are provided.

DESCRIPTION OF EMBODIMENTS

Embodiments for carrying out the invention will be described below in detail. However, the invention is not limited to the following embodiments. In the following embodiments, components (including elemental steps, etc.) thereof are not essential unless otherwise specified. The same applies to numerical values and ranges, which do not limit the invention.

In the present disclosure, the term "step" encompasses an independent step separated from other steps as well as a step that is not clearly separated from other steps, as long as a purpose of the step can be achieved.

In the present disclosure, a numerical range specified using "(from) . . . to . . . " represents a range including the numerical values noted before and after "to" as a minimum value and a maximum value, respectively.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, each component may include plural substances corresponding to the component. In a case in which plural substances corresponding to a component are present in a composition, an amount or content of the component in the composition means the total amount or content of the plural substances present in the composition unless otherwise specified.

The term "layer" as used herein encompasses, when a region in which the layer is present is observed, not only a case in which the layer is formed over the entire observed region, but also a case in which the layer is formed at only a part of the observed region.

The term "layered" as used herein means disposing layers on one another, in which two or more layers may be bonded with each other, or may be attachable to/detachable from one another.

The term "epoxy compound" as used herein means a compound having an epoxy group in a molecule thereof. The term "epoxy resin" refers to a concept that regards multiple epoxy compounds in an uncured state as a group.

<Epoxy Resin>

An epoxy resin in an embodiment of the present disclosure includes a reaction product between: an epoxy compound having a mesogenic structure; and at least one selected from the group consisting of an aromatic hydroxycarboxylic acid having a carboxy group and a hydroxy group bonded to an aromatic ring and an aromatic dicarboxylic acid having two carboxy groups bonded to an aromatic group. Hereinafter, the at least one selected from the group consisting of an aromatic hydroxycarboxylic acid having a carboxy group and a hydroxy group bonded to an aromatic ring and an aromatic dicarboxylic acid having two carboxy groups bonded to an aromatic group may be comprehensively referred to as a "specific aromatic carboxylic acid".

An epoxy resin in another embodiment of the present disclosure includes at least one compound selected from the group consisting of the following General Formulae (E1) and (E2).

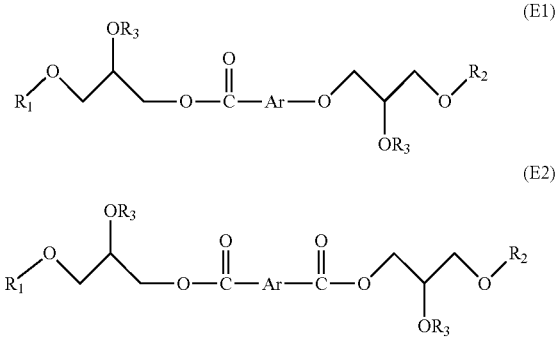

In General Formulae (E1) and (E2), Ar represents a substituted or unsubstituted aromatic ring; each of $R_1$ and $R_2$ independently represents a monovalent organic group having a glycidyl group, wherein at least one of $R_1$ or $R_2$ includes a mesogenic structure; and each $R_3$ independently represents a hydrogen atom or a monovalent organic group.

The at least one compound selected from the group consisting of General Formulae (E1) and (E2) may be a reaction product between a compound having a mesogenic structure and a specific aromatic carboxylic acid.

According to the epoxy resin in the present disclosure, a cured product having excellent fracture toughness can be manufactured. While the reason for this is not necessarily clear, it is presumed as follows.

It is presumed that the epoxy resin in the present disclosure forms a higher-order structure when cured, by including a mesogenic structure in a part thereof, thereby obtaining excellent fracture toughness. Further, the epoxy resin in the present disclosure further includes a carbonyl group bonded to an aromatic group. It is presumed that this carbonyl group promotes intermolecular interactions upon curing of an epoxy resin composition containing the epoxy resin in the present disclosure, thereby achieving a higher fracture toughness. In addition, it is presumed that a carbon atom of the carbonyl group that is directly bonded to the aromatic ring is located in the same plane as the aromatic ring, and that the π electron on the carbon atom is delocalized. It is presumed that this improves the interactions between the molecules.

The epoxy resin in the present disclosure includes a reaction product between an epoxy compound having a mesogenic structure and a specific aromatic carboxylic acid, or includes at least one compound selected from the group consisting of General Formulae (E1) and (E2), and may or may not include other epoxy compound(s), or may be a mixture of multiple types of epoxy compounds. For example, the epoxy resin in the present disclosure may be a mixture containing an epoxy compound (epoxy monomer) that has remained unreacted in the synthesis of the epoxy resin in the present disclosure. Further, the epoxy resin in the present disclosure may be a mixture of a monomer, dimer, trimer and the like of an epoxy compound having a mesogenic structure that is present in the synthesis mixture.

First, the epoxy compound having a mesogenic structure and the specific aromatic carboxylic acid will be explained in detail.

—Epoxy Compound Having Mesogenic Structure—

An epoxy resin containing an epoxy compound having a mesogenic structure or an epoxy compound having a structure derived therefrom tends to form a higher-order structure when cured. Accordingly, its cured product tends to have a superior fracture toughness as compared to an epoxy resin containing no epoxy compound having a mesogenic structure or epoxy compound having a structure derived therefrom.

A mesogenic structure refers to a structure that is capable of causing an epoxy resin that is a reaction product of an epoxy compound having the mesogenic structure to exhibit liquid crystallinity. Specific examples of the mesogenic structure include a biphenyl structure, a phenyl benzoate structure, a cyclohexyl benzoate structure, an azobenzene structure, a stilbene structure, a terphenyl structure, an anthracene structure, a derivative of any of these structures, and a structure in which two or more of these mesogenic structures are linked via a linking group.

One molecule of the epoxy compound may have one mesogenic structure, or two or more mesogenic structures. In the epoxy compound having two or more mesogenic structures, the two or more mesogenic structures may be the same as or different from each other.

An epoxy resin that contains an epoxy compound having a mesogenic structure or an epoxy compound having a structure derived therefrom can form a higher-order structure in a cured product of an epoxy resin composition containing the epoxy resin. Here, the higher-order structure refers to a structure having a higher-order structural body in which its components are arranged to form a micro- and organized structure. Examples of the higher-order structure include a crystalline phase and a liquid crystalline phase. The presence or absence of the higher-order structure can be determined using a polarized light microscope. Specifically, the presence or absence of the higher-order structure can be determined by whether or not an interference pattern due to depolarization is observed in the observation under crossed Nicols. The higher-order structural body generally exists in a cured product of the epoxy resin composition in an island shape to form a domain structure, and each island corresponds to the higher-order structure. The components of the higher-order structure themselves are generally formed by covalent bonding.

Examples of the higher-order structure formed in a cured state include a nematic structure and a smectic structure. The nematic structure and smectic structure are each a type of liquid crystal structure. The nematic structure is a liquid crystal structure that has only an orientational ordering in which the major axes of the molecules are oriented in the same direction. On the other hand, the smectic structure is a liquid crystal structure that has a one-dimension positional ordering in addition to the orientational ordering, and has a layered structure. The degree of ordering is higher in the smectic structure than in the nematic structure. Therefore, from the viewpoints of thermal conductivity and fracture toughness of the cured product, it is more preferable that a higher-order structure having a smectic structure is formed.

Whether or not a smectic structure is formed in a cured product can be determined by X-ray diffraction analysis of the cured product. The X-ray diffraction analysis can be performed using, for example, an X-ray diffractometer by Rigaku Corporation. In the present disclosure, in an X-ray diffraction analysis performed using CuKα1 radiation at a tube voltage of 40 kV and a tube current of 20 mA in a measurement range of $2\theta=1°$ to $30°$, when a diffraction peak is found in a range of $2\theta=2°$ to $10°$, it is determined that a smectic structure is formed in the cured product.

The mesogenic structure may be a structure represented by the following General Formula (M).

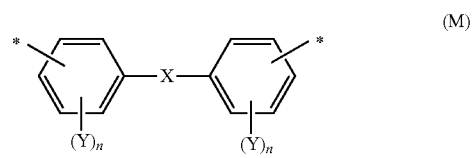

(M)

In General Formula (M), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

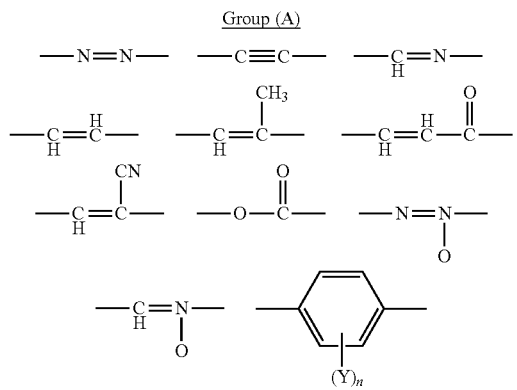

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In the mesogenic structure represented by General Formula (M), when X is a linking group that includes at least one divalent group selected from the following Group (A), the linking group is preferably a linking group that includes at least one divalent group selected from the following Group (Aa), more preferably is a linking group that includes at least one divalent group selected from the following Group (A) and is a linking group that has at least one ring structure.

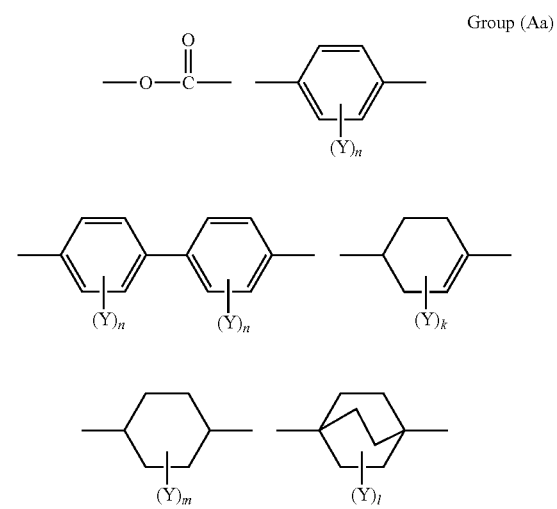

Group (Aa)

In Group (Aa), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

From the viewpoint of the tendency to form a higher-order structure in a cured product, it is preferable that the mesogenic structure represented by General Formula (M) is a mesogenic structure represented by the following General Formula (M-1).

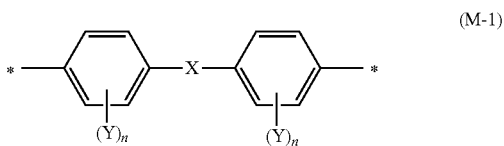
(M-1)

In General Formula (M-1), definitions and preferable examples of X, Y, n and * are the same as the definitions and preferable examples of X, Y, n and * in General Formula (M).

Preferable examples of the mesogenic structure represented by General Formula (M-1) includes a mesogenic structure represented by the following General Formula (M-2), a mesogenic structure represented by the following General Formula (M-3), and a mesogenic structure represented by the following General Formula (M-4). In General Formula (M-2), General Formula (M-3) and General Formula (M-4), definitions and preferable examples of Y, n and * are the same as the definitions and preferable examples of Y, n and * in General Formula (M-1).

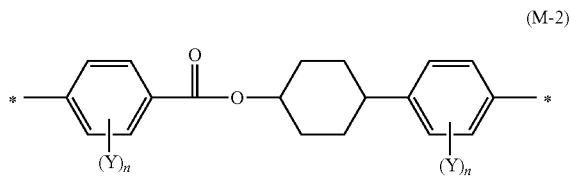
(M-2)

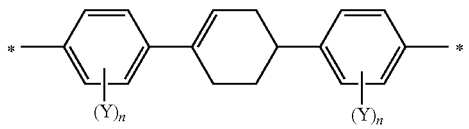
(M-3)

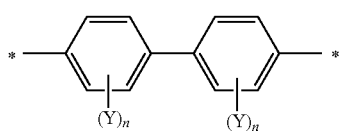
(M-4)

The epoxy compound having a mesogenic structure may include an epoxy compound having a structure represented by the following General Formula (1-m).

(1-m)

In General Formula (1-m), definitions and preferable examples of X, Y and n are the same as the definitions and preferable examples of X, Y and n in General Formula (M).

From the viewpoint of the tendency to form a higher-order structure in a cured product, the epoxy compound having a structure represented by General Formula (1-m) is preferably an epoxy compound having a structure represented by the following General Formula (2-m).

(2-m)

In General Formula (2-m), definitions and preferable examples of X, Y and n are the same as the definitions and preferable examples of X, Y and n in General Formula (1-m).

Preferable examples of the epoxy compound having a structure represented by General Formula (2-m) includes an epoxy compound having a structure represented by the following General Formula (3-m), an epoxy compound having a structure represented by the following General Formula (4-m), and an epoxy compound having a structure represented by the following General Formula (5-m). From the viewpoint of improving the fracture toughness of the cured product, it is preferable that the epoxy compound represented by General Formula (3-m) is used.

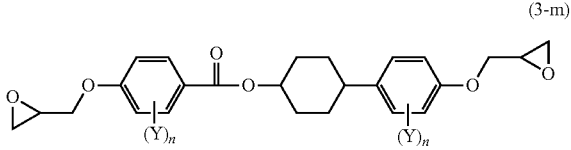
(3-m)

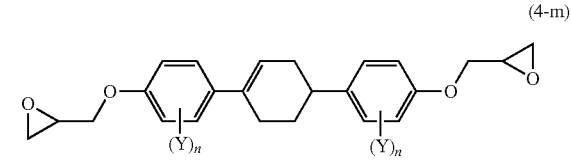
(4-m)

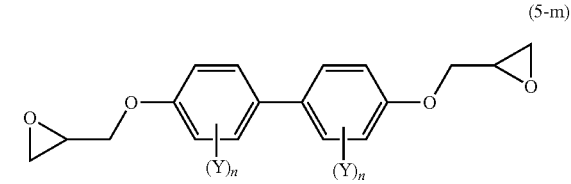
(5-m)

In General Formula (3-m), General Formula (4-m) and General Formula (5-m), definitions and preferable examples of Y and n are the same as the definitions and preferable examples of Y and n in General Formula (2-m).

For the epoxy compound, a commercially available product may be used. For example, as the epoxy compound represented by General Formula (5-m), YX4000 (Mitsubishi Chemical Corporation), YL6121H (Mitsubishi Chemical Corporation) and the like are available.

The epoxy equivalent weight of the epoxy compound having a mesogenic structure is not particularly limited. From the viewpoint of, for example, ensuring properties such as crosslinking distance, glass transition temperature and elastic modulus, the epoxy equivalent weight is preferably from 100 to 300 g/eq, more preferably from 120 to 280 g/eq, and further preferably from 140 to 260 g/eq. In the present disclosure, the epoxy equivalent weight is measured by perchloric acid titration.

—Specific Aromatic Carboxylic Acid—

The specific aromatic carboxylic acid is at least one selected from the group consisting of an aromatic hydroxycarboxylic acid having a carboxy group and a hydroxy group bonded to an aromatic ring (which may be simply referred to as an aromatic hydroxycarboxylic acid hereinafter), and an aromatic dicarboxylic acid having two carboxy groups bonded to an aromatic group (which may be simply referred to as an aromatic dicarboxylic acid hereinafter). One type of specific aromatic carboxylic acid may be used singly, or two or more types thereof may be used in combination.

The specific aromatic carboxylic acid may or may not have a substituent other than a carboxy group or a hydroxy group. Examples of the substituent include an alkyl group having 1 to 5 carbon atoms, an ether group in which an organic group is bonded via an oxygen atom, and a carboxylate ester group. The number of carbon atoms of the organic group is not particularly limited, and may be, for example, 1 to 20, 1 to 10, or 1 to 5.

The aromatic hydroxycarboxylic acid has a structure in which at least one hydroxy group and at least one carboxy group are bonded to an aromatic ring (note that the aromatic hydrocarboxylic acid does not include an aromatic dicarboxylic acid). From the viewpoint of ease of handling or the like, the aromatic hydroxycarboxylic acid is preferably an aromatic hydroxycarboxylic acid in which one carboxy group and one hydroxy group are bonded to an aromatic ring.

The aromatic group included in the specific aromatic carboxylic acid may be a monocyclic ring or a multicyclic fused ring, and is preferably at least one selected from the group consisting of a benzene ring and a naphthalene ring. Accordingly, preferable examples of the specific aromatic carboxylic acid include a hydroxybenzenecarboxylic acid, a benzenedicarboxylic acid, a hydroxynaphthalenecarboxylic acid, and a naphthalenedicarboxylic acid. In particular, from the viewpoint of favorable fracture toughness and melt viscosity, at least one selected from the group consisting of a hydroxybenzenecarboxylic acid and a hydroxynaphthalenecarboxylic acid is preferable, and from the viewpoint of high fracture toughness, a benzenedicarboxylic acid is preferable.

In a case in which the specific aromatic carboxylic acid is hydroxybenzenecarboxylic acid, the hydroxybenzenecarboxylic acid preferably has a structure in which one hydroxy group and one carboxy group are bonded to a benzene ring. The substitution position of the hydroxy group relative to the carboxy group of the hydroxybenzenecarboxylic acid may be at the ortho, meta, or para position, and is preferably at the meta or para position, and further preferably at the para position. It is presumed that, when the substitution position of the hydroxy group relative to the carboxy group is at the para position, linearity of the molecular structure of the epoxy compound synthesized using the hydroxybenzenecarboxylic acid is increased, whereby the molecules become oriented more easily, and the fracture toughness is further improved.

Examples of the hydroxybenzenecarboxylic acid include 4-hydroxybenzoic acid, 3-hydroxybenzoic acid, 2-hydroxybenzoic acid, and a hydroxybenzenecarboxylic acid in which at least one hydrogen atom bonded to the aromatic ring of any of these hydroxybenzenecarboxylic acids is substituted with a substituent, such as an alkyl group having 1 to 5 carbon atoms, an ether group in which an organic group is bonded via an oxygen atom, or a carboxylate ester group. The number of carbon atoms of the organic group is not particularly limited, and may be, for example, 1 to 20, 1 to 10, or 1 to 5. In particular, from the viewpoint of favorable fracture toughness, melt viscosity, heat resistance or the like, 4-hydroxybenzoic acid is preferable.

In a case in which the specific aromatic carboxylic acid is a benzenedicarboxylic acid, the benzenedicarboxylic acid may be in the ortho-, para- or meta-form, and is preferably in the para-form from the viewpoint of the fracture toughness. Examples of the benzenedicarboxylic acid include phthalic acid, isophthalic acid, terephthalic acid, and a benzenedicarboxylic acid in which at least one hydrogen atom bonded to the aromatic ring of any of these benzenedicarboxylic acids is substituted with a substituent, such as an alkyl group having 1 to 5 carbon atoms, a hydroxy group, an ether group in which an organic group is bonded via an oxygen atom, or a carboxylate ester group. The number of carbon atoms of the organic group is not particularly limited, and may be, for example, 1 to 20, 1 to 10, or 1 to 5.

In a case in which the specific aromatic carboxylic acid is a hydroxynaphthalenecarboxylic acid, the hydroxynaphthalenecarboxylic acid preferably has a structure in which one hydroxy group and one carboxy group are bonded to a naphthalene ring. The substitution positions of the carboxy group and the hydroxy group of the hydroxynaphthalenecarboxylic acid are not particularly limited, and from the viewpoint of the fracture toughness, a combination of 2 and 6 positions are preferable.

Examples of the hydroxynaphthalenecarboxylic acid include 2-hydroxy-1-naphthoic acid, 3-hydroxy-1-naphthoic acid, 4-hydroxy-1-naphthoic acid, 5-hydroxy-1-naphthoic acid, 6-hydroxy-1-naphthoic acid, 7-hydroxy-1-naphthoic acid, 8-hydroxy-1-naphthoic acid, 1-hydroxy-2-naphthoic acid, 3-hydroxy-2-naphthoic acid, 6-hydroxy-2-naphthoic acid, 7-hydroxy-2-naphthoic acid, and a hydroxynaphthalenecarboxylic acid in which at least one hydrogen atom bonded to the aromatic ring of any of these hydroxynaphthalenecarboxylic acids is substituted with a substituent, such as an alkyl group having 1 to 5 carbon atoms, an ether group in which an organic group is bonded via an oxygen atom, or a carboxylate ester group. The number of carbon atoms of the organic group is not particularly limited, and may be, for example, from 1 to 20, from 1 to 10, or from 1 to 5. From the viewpoint of availability, 2-hydroxy-1-naphthoic acid, 6-hydroxy-1-naphthoic acid, 3-hydroxy-2-naphthoic acid, and 6-hydroxy-2-naphthoic acid are preferable, and from the viewpoint of favorable fracture toughness, melt viscosity, heat resistance or the like, 6-hydroxy-2-naphthoic acid is more preferable.

In the case in which the specific aromatic carboxylic acid is a naphthalenedicarboxylic acid, the substitution positions of the carboxy groups are not particularly limited. Examples of the naphthalenedicarboxylic acid include 1,4-naphthalenedicarboxylic acid, 2,3-naphthalenedicarboxylic acid, 2,6-naphthalenedicarboxylic acid, and a naphthalenedicarboxylic acid in which at least one hydrogen atom bonded to the aromatic ring of any of these naphthalenedicarboxylic acids is substituted with a substituent, such as an alkyl group having 1 to 5 carbon atoms, a hydroxy group, an ether group in which an organic group is bonded via an oxygen atom, or a carboxylate ester group. The number of carbon atoms of the organic group is not particularly limited, and may be, for example, 1 to 20, 1 to 10, or 1 to 5. From the viewpoint of the fracture toughness, 2,6-naphthalenedicarboxylic acid is preferable.

—Reaction Product Between Epoxy Compound Having Mesogenic Structure and Specific Aromatic Carboxylic Acid—

The mode of the reaction product between an epoxy compound having a mesogenic structure and a specific aromatic carboxylic acid is not particularly limited as long as it is a product of a reaction between the epoxy compound having a mesogenic structure and the specific aromatic carboxylic acid described above.

For example, the reaction product may be a dimer, trimer or the like of the epoxy compound having a mesogenic structure, which is a raw material. Further, the reaction product may be a reaction product in which the epoxy compound having a mesogenic structure has been linearly polymerized by reacting with the specific aromatic carboxylic acid, or may be a reaction product having a brunched structure.

More specific examples of the reaction product include a dimer having two molecules of the epoxy compound having a mesogenic structure linked by one molecule of the specific aromatic carboxylic acid, and a trimer having three molecules of the epoxy compound having a mesogenic structure linked by two molecules of the specific aromatic carboxylic acid. Further, the reaction product may be a trimer, a tetramer or the like having a branched structure generated by addition of one or two molecules of the epoxy compound having a mesogenic structure to the hydroxy group generated by the synthesis of the dimer described above.

The reaction product may be a reaction product obtained by a reaction of other raw material(s) in addition to the epoxy compound having a mesogenic structure and the specific aromatic carboxylic acid. For example, the reaction product may be a reaction product of the epoxy compound having a mesogenic structure, another epoxy compound, and the specific aromatic carboxylic acid. Examples of the "another epoxy compound" include, for example, an epoxy compound having a substituted or unsubstituted benzene ring and two or more glycidyloxy groups, and a compound having a substituted or unsubstituted naphthalene ring and two or more glycidyloxy groups. Examples of the substituent in the case in which the benzene ring or the naphthalene ring has a substituent include an organic group having 1 to 18 carbon atoms.

The reaction product between the epoxy compound having a mesogenic structure and the specific aromatic carboxylic acid may include at least one compound selected from the group consisting of the above-described General Formulae (E1) and (E2). General Formulae (E1) and (E2) are again shown below.

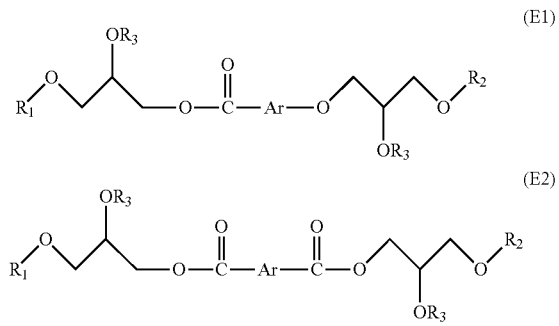

In General Formulae (E1) and (E2), Ar represents a substituted or unsubstituted aromatic ring; each of $R_1$ and $R_2$ independently represents a monovalent organic group having a glycidyl group, wherein at least one of $R_1$ or $R_2$ includes a mesogenic structure; and each $R_3$ independently represents a hydrogen atom or a monovalent organic group.

In General Formulae (E1) and (E2), the aromatic ring represented by Ar may be a monocyclic ring or may be a multicyclic fused ring, and is preferably at least one selected from the group consisting of a benzene ring and a naphthalene group. The carbonyl group and the oxygen atom adjacent to Ar of General Formula (E1) and the two carbonyl groups adjacent to Ar of General Formula (E2) are directly bonded to the aromatic ring represented by Ar.

In General Formulae (E1) and (E2), the monovalent organic group having a glycidyl group represented by each of $R_1$ and $R_2$ may be, for example, a monovalent organic group having a structure of the epoxy compound having a mesogenic structure described above with one glycidyloxy group removed therefrom, or a monovalent organic group having a structure of another epoxy compound with one glycidyloxy group removed therefrom.

Examples of the "monovalent organic group having a structure of the epoxy compound having a mesogenic structure with one glycidyloxy group removed therefrom" include a monovalent organic group having: a glycidyl group; and a biphenyl structure, a phenylbenzoate structure, a cyclohexylbenzoate structure, an azobenzene structure, a stilbene structure, a terphenyl structure, an anthracene structure, a derivative thereof, or a structure in which two or more of these mesogenic structures are linked via a linking group.

Examples of the "monovalent organic group having a structure of another epoxy compound with one glycidyloxy group removed therefrom" include a monovalent organic group having a glycidyl group and an aliphatic hydrocarbon group, and a monovalent organic group having a glycidyl group and an aromatic hydrocarbon group. Each of the aliphatic carbohydrate group and the aromatic carbohydrate group may or may not have a substituent. Examples of the substituent include an organic group having 1 to 18 carton atoms.

Examples of the aliphatic hydrocarbon group in the "monovalent organic group having a glycidyl group and an aliphatic hydrocarbon group" include an alkylene group and alkenylene group.

Examples of the aromatic hydrocarbon group in the "monovalent organic group having a glycidyl group and an aromatic hydrocarbon group" include a phenylene group and a naphthylene group. As an example of the monovalent organic group in a preferable embodiment having a glycidyl group and an aromatic hydrocarbon group include a phenylene group bonded by a glycidyloxy group and a naphthylene group bonded by a glycidyloxy group.

In General Formulae (E1) and (E2), at least one of $R_1$ or $R_2$ has a mesogenic structure, and both $R_1$ and $R_2$ may have a mesogenic structure. $R_1$ and $R_2$ may have the same structure, or may have different structures.

In General Formulae (E1) and (E2), the number of carbon atoms in the monovalent organic group represented by each of $R_1$ and $R_2$ is not particularly limited, and may be, for example, 25 or less, 20 or less, or 15 or less.

In General Formulae (E1) and (E2), the monovalent organic group having a glycidyl group represented by each of $R_1$ and $R_2$ may have a structure derived from an epoxy compound. Such an epoxy compound is not particularly limited, and examples thereof include an epoxy compound having two or more epoxy groups in a molecule. An epoxy compound having two epoxy groups in a molecule is preferable, and an epoxy compound having two glycidyl ether groups is more preferable. The epoxy compound may be the above-described epoxy compound having a mesogenic structure, or may be another epoxy compound. Examples of the "another epoxy compound" include, for example, an epoxy compound having a substituted or unsubstituted benzene ring and two or more glycidyloxy groups, and a compound having a substituted or unsubstituted naphthalene ring and two or more glycidyloxy groups. In the case in which the benzene ring or the naphthalene ring has a substituent, examples of the substituent include an organic group having 1 to 18 carbon atoms.

In General Formulae (E1) and (E2), the monovalent organic group having a glycidyl group represented by each of $R_1$ and $R_2$ has at least one glycidyl group, and may have two or more glycidyl groups. The position of the glycidyl group may be at the terminal of the monovalent organic group represented by each of $R_1$ or $R_2$.

In General Formulae (E1) and (E2), $R_3$ represents a monovalent organic group or a hydrogen atom.

From the viewpoints of suppressing the increase in viscosity even when shear stress is applied and achieving excellent viscosity stability, $R_3$ is preferably a monovalent organic group. When $R_3$ is a monovalent organic group, the epoxy compound tends have excellent viscosity stability. While the reason for this is not necessarily clear, this is presumably in part attributed to suppressed orientation of the molecules during the application of the shear stress due to partly disturbed linearity of the molecule structure of the epoxy compound at the branched portion (the portion represented by $OR_3$). By the method of introducing a branch into the molecule of the epoxy compound having a mesogenic structure, the orientation of the molecules by the application of shear stress can be suppressed while the stacking force of the molecules caused by the mesogenic structure is maintained. This tends to enable achieving both improvement in the fracture toughness of the cured product and improvement in the ease of handling before the curing.

In General Formulae (E1) and (E2), at least one $R_3$ preferably has a structure of the following Formula (c).

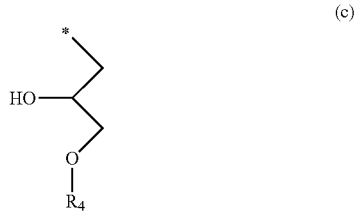

(c)

In Formula (c), $R_4$ represents a monovalent organic group, and * represents a bonding site to an oxygen atom.

Examples of the monovalent organic group represented by $R_4$ include those described in detail as the monovalent organic group having a glycidyl group represented by each of $R_1$ and $R_2$. $R_4$ may have the same structure as $R_1$ and/or $R_2$, or may have a structure different from $R_1$ and/or $R_2$.

[Synthesis Method of Epoxy Resin]

The method for obtaining the epoxy resin in the present disclosure is not particularly limited. For example, the epoxy resin in the present disclosure can be obtained by a reaction of an epoxy compound having a mesogenic structure, a specific aromatic carboxylic acid, and other epoxy compound(s) used as necessary. Hereinafter, in the descriptions of the synthesis method of the epoxy resin, the epoxy compound having a mesogenic structure and other epoxy compound(s) used as necessary, which are used as raw materials, may be comprehensively referred to as an "epoxy monomer".

The method of reacting the epoxy monomer with the specific aromatic carboxylic acid may include, specifically, dissolving the epoxy monomer, the specific aromatic carboxylic acid and a reaction catalyst used as necessary in a solvent, and stirring and heating the mixture to allow the reaction to proceed.

Alternatively, for example, the reaction may be carried out by mixing the epoxy monomer and the specific aromatic carboxylic acid using a reaction catalyst and stirring and heating the mixture to allow the reaction to proceed. Further, the reaction may be carried out by mixing the epoxy monomer and the specific aromatic carboxylic acid without using a reaction catalyst or a solvent, and stirring and heating the mixture to allow the reaction to proceed.

In the case a case in which a branched structure represented by General Formula (c) is introduced into the reaction product, the method for introducing the branched structure is not particularly limited. For example, the branched structure can be introduced by reacting an epoxy group of the epoxy monomer with a secondary hydroxy group generated by the reaction between the epoxy monomer and the specific aromatic carboxylic acid.

The progress of the reaction between the epoxy group of the epoxy monomer and the secondary hydroxy group generated by the reaction between the epoxy monomer and the specific aromatic carboxylic acid can be controlled by, for example, appropriately selecting the type of reaction catalyst used for the reaction. For example, by employing a reaction catalyst having a relatively low activity, the proportion of the formed branched structures tends to become low since, while the reaction between the epoxy group of the epoxy monomer and the carboxy group or hydroxy group of the specific aromatic carboxylic acid proceeds, the reaction between the secondary hydroxy group generated by the foregoing reaction and another epoxy monomer hardly proceeds. In contrast, by employing a reaction catalyst having a relatively high activity, the proportion of the formed branched structures tends to become high since, in addition to the reaction between the epoxy group of the epoxy monomer and the carboxy group or hydroxy group of the specific aromatic carboxylic acid, the reaction between the secondary hydroxy group generated by the foregoing reaction and another epoxy monomer proceeds.

The solvent is not particularly limited as long as it can dissolve the epoxy monomer and the specific aromatic carboxylic acid, and can be heated to a temperature required to allow the reaction of these compounds to proceed. Specific examples thereof include cyclohexanone, cyclopentanone, ethyl lactate, propyleneglycol monomethyl ether, N-methylpyrrolidone, methyl cellosolve, ethyl cellosolve, and propyleneglycol monopropyl ether.

The amount of the solvent is not particularly limited as long as the epoxy monomer, the specific aromatic carboxylic acid and the reaction catalyst used as necessary can be dissolved at the reaction temperature. Although the solubility depends on the type of raw materials to be subjected to the reaction, the type of solvent and the like, the viscosity of the solution after the reaction tends to be in a preferred range when, for example, the solvent is in an amount such that the initial solid content concentration becomes from 20 to 60% by mass.

The type of reaction catalyst is not particularly limited, and an appropriate catalyst may be selected based on the reaction rate, reaction temperature, storage stability and the like. Specific examples include an imidazole compound, an organic phosphorous compound, a tertiary amine and a quaternary ammonium salt. One kind of reaction catalyst may be used singly, or two or more kinds thereof may be used in combination.

From the viewpoint of promoting the reaction between the epoxy monomer and the specific aromatic carboxylic acid, the reaction catalyst is preferably an organic phosphorous compound or an imidazole compound. From the viewpoint of suppressing the self-polymerization of the epoxy groups thereby suppressing gelation, from the viewpoint of selectively promoting the reaction between the epoxy group of the epoxy monomer and the carboxy group or hydroxy group of the specific aromatic carboxylic acid to control the structure of the epoxy resin to be obtained, and from the viewpoint of heat resistance of the cured product, the reaction catalyst is preferably an organic phosphorous compound.

Preferable examples of the organic phosphorous compound include an organic phosphine compound; a compound having intramolecular polarization obtained by adding, to an organic phosphine compound, a compound having a π bond such as a maleic acid anhydride, a quinone compound, diazodiphenylmethane or a phenol resin; and a complex formed by an organic phosphine compound and an organic boron compound.

Specific examples of the organic phosphine compound include triphenylphosphine, diphenyl(p-tolyl)phosphine, a tris(alkylphenyl)phosphine, a tris(alkoxyphenyl)phosphine, a tris(alkylalkoxyphenyl)phosphine, a tris(dialkylphenyl)phosphine, a tris(trialkylphenyl)phosphine, a tris(tetraalkylphenyl)phosphine, a tris(dialkoxyphenyl)phosphine, a tris(trialkoxyphenyl)phosphine, a tris(tetraalkoxyphenyl)phosphine, a trialkylphosphine, a di alkylarylphosphine, and an alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone and phenyl-1,4-benzoquinone.

Specific examples of the organic boron compound include tetraphenyl borate, tetra-p-tolyl borate and tetra-n-butyl borate.

In the case of introducing a branched structure represented by General Formula (c), the reaction catalyst is preferably an inner salt-type phosphine compound or an intermolecular salt-type phosphine compound, and more preferably a reaction adduct of tributylphosphine and hydroquinone or a salt of tetrabutylphosphine and a carboxylic acid.

The amount of the reaction catalyst is not particularly limited. From the viewpoints of the reaction rate and storage stability, the amount of the reaction catalyst is preferably from 0.01 to 1.5 parts by mass, and more preferably from 0.05 to 1 part by mass, with respect to 100 parts by mass of the total amount of the epoxy monomer and the specific aromatic carboxylic acid.

In the case in which the epoxy monomer is reacted with the specific aromatic carboxylic acid, the epoxy monomer may be thoroughly reacted so that the epoxy monomer is not remaining in the epoxy resin after the reaction, or part of the epoxy monomer may remain unreacted.

The reaction between the epoxy monomer and the specific aromatic carboxylic acid may be carried out using a reaction container, such as a flask for small-scale synthesis, or a reaction cauldron for large-scale synthesis. A specific example of the synthesis method is described below.

First, the epoxy monomer is placed in a reaction container, with a solvent added thereto as necessary, and is dissolved by heating the reaction container to a reaction temperature with an oil bath or a heating medium. The specific aromatic carboxylic acid is added thereto, with a reaction catalyst subsequently added as necessary, to initiate the reaction. Subsequently, the solvent is distilled off as necessary under a reduced pressure, whereby the epoxy resin in the present disclosure is obtained.

The reaction temperature is not particularly limited as long as the reaction between the epoxy group of the epoxy monomer and the functional groups of the specific aromatic carboxylic acid proceeds. For example, the reaction temperature is preferably in a range of from 100 to 180° C., and more preferably in a range of from 100 to 170° C. In a case in which the reaction temperature is 100° C. or higher, the time for completing the reaction tends to be shortened. In a case in which the reaction temperature is 180° C. or lower, likelihood of gelation tends to be reduced.

The blending ratio between the epoxy monomer and the specific aromatic carboxylic acid in the synthesis of the epoxy resin in the present disclosure is not particularly limited. For example, the blending ratio may be adjusted such that the ratio between the number of equivalents of the epoxy group of the epoxy monomer (A) and the total number of equivalents of the functional groups (the carboxy group and hydroxy group) of the specific aromatic carboxylic acid (B) (A:B) becomes in a range of from 10:10 to 10:0.01. From the viewpoints of fracture toughness and heat resistance of the cured product, the blending ratio is preferably adjusted such that A:B becomes in a range of from 10:5 to 10:0.1. In a case in which the epoxy monomer includes an epoxy compound having a mesogenic structure and other epoxy compound(s), the above number of equivalents of the epoxy group (A) refers to the total number of equivalents of the epoxy compound having a mesogenic structure and the other epoxy compound(s).

From the viewpoint of ease of handling of the epoxy monomer, the blending ratio is preferably adjusted such that the ratio between the number of equivalents of the epoxy group (A) and the number of equivalents of the functional groups of the specific aromatic carboxylic acid (the carboxyl group and hydroxy group) (B) (A:B) becomes in a range of from 10:1.5 to 10:3.0, more preferably from 10:1.6 to 10:2.9, and further preferably from 10:1.7 to 10:2.8.

From the viewpoint of effectively achieving both favorable flexural modulus and fracture toughness, the blending ratio is preferably adjusted such that the ratio between the number of equivalents of the epoxy group (A) and the number of equivalents of the functional groups of the specific aromatic carboxylic acid (the carboxy group and hydroxy group) (B) (A:B) becomes in a range of from 10:1.0 to 10:3.0, more preferably from 10:1.4 to 10:2.6, and further preferably from 10:1.6 to 10:2.4.

The structure of the synthesized epoxy resin can be determined by, for example, comparing the molecular weight of the epoxy resin that is predicted to be obtained from the reaction between the epoxy monomer and the specific aromatic carboxylic acid with the molecular weight of the targeted compound determined by liquid chromatography using a liquid chromatograph equipped with a UV spectrum detector and mass spectrum detector.

The liquid chromatography can be performed by the method described below. Absorbance at a wavelength of 280 nm is detected by the UV spectrum detector, and the detection by the mass spectrum detector is performed at an ionization voltage of 2700 V.

[Physical Properties of Epoxy Resin]
[Weight-Average Molecular Weight]

The weight-average molecular weight (Mw) of the epoxy resin is not particularly limited. From the viewpoint of lowering the viscosity, the weight-average molecular weight (Mw) of the epoxy resin is preferably from 500 to 4000, more preferably from 700 to 3500, and further preferably from 800 to 3000.

In the present disclosure, the weight-average molecular weight (Mw) is a value measured by liquid chromatography. The liquid chromatography can be performed, for example, under the following conditions. For example, the measurement is carried out by a gradient method using a LaChrom II C18 from Hitachi, Ltd. as an analysis column, continuously changing the mixing ratio (by volume) of the eluent in the order of (acetonitrile)/(tetrahydrofuran)/(10 mmol/1 aqueous ammonium acetate solution)=20/5/75, acetonitrile/tetrahydrofuran=80/20 (20 min from the start), and acetonitrile/tetrahydrofuran=50/50 (35 min from the start). The liquid chromatography is performed at a flow rate of, for example, 1.0 ml/min.

[Epoxy Equivalent Weight]

The epoxy equivalent weight of the epoxy resin is not particularly limited. From the viewpoint of, for example, flowability of the epoxy resin, thermal conductivity of the cured product, or achieving both favorable fracture toughness and flexural modulus, the epoxy equivalent weight is preferably from 245 to 500 g/eq, more preferably from 250 to 450 g/eq, and further preferably from 300 to 380 g/eq.

[Melt Viscosity]

The viscosity of the epoxy resin is not particularly limited, and may be determined in accordance with the use of the epoxy resin. From the viewpoint of ease of handling, the melt viscosity of the epoxy resin at 100° C. is preferably 200 Pa·s or less, more preferably 100 Pa·s or less, further preferably 50 Pa·s or less, and particularly preferably 20 Pa·s or less. From the viewpoint of suppressing the increase in the viscosity due to the orientation upon application of shear stress when the epoxy resin is mixed with a curing agent, the melt viscosity of the epoxy resin at 100° C. is preferably 1.0 Pa·s or more, more preferably 2.0 Pa·s or more, and further preferably 3.0 Pa·s or more.

The melt viscosity of the epoxy resin at 100° C. is preferably from 1.0 to 100.0 Pa·s, more preferably from 2.0 to 50.0 Pa·s, and further preferably from 3.0 to 20.0 Pa·s.

The melt viscosity of the epoxy resin at 100° C. can be measured using a cone and plate viscometer (e.g., CAP2000 from Brookfield). For example, the measurement may be performed under the conditions of a measurement temperature of 100±2° C. and a rotation speed of 50 rotations per speed (rpm) using a cone No. 5.

[Viscosity Stability]

When the epoxy resin has the above-described branched structure represented by General Formula (c), increase in the viscosity upon application of shear stress tends to be suppressed, whereby favorable viscosity stability tends to be exhibited. The viscosity stability of the epoxy resin can be determined by, for example, continuously measuring the melt viscosity while applying shear stress to the epoxy resin under a predetermined condition using a viscoelastometer.

For example, in a case in which a dynamic shear viscosity is measured with the gap between the parallel plate and the stage of 0.05 mm, a frequency of 0.5 Hz, a strain of 8000% and a temperature of 80° C. (constant) over 80 continuous minutes, when the value of $\eta'2/\eta'1$, which is obtained by $\eta'1$ (Pa·s) representing the initial (immediately after the initiation of the measurement) dynamic shear viscosity and $\eta'2$ (Pa·s) representing the maximum value of the dynamic shear viscosity obtained during the measurement, is small, it can be determined that the epoxy resin has a favorable viscosity stability, showing only a small degree of increase in the viscosity by the application of shear stress.

The value of $\eta'2/\eta'1$ is not particularly limited, and may be, for example, 3 or less, 2 or less, or 1.5 or less, from the viewpoint of ease of handling.

The absolute value of the dynamic shear viscosity in the above measurement is not particularly limited. For example, the initial dynamic shear viscosity may be 200 Pa·s or less.

[GPC Peak Area Ratio]

The content of the monomer of the epoxy compound having a mesogenic structure with respect to the total amount of the epoxy resin in the present disclosure is not particularly limited. The content can be obtained by the percentage (%) of the area of the peak originated from the monomer of the epoxy compound having a mesogenic structure with respect to the total area of the peaks originated from the entire epoxy resin (hereinafter, this percentage is also referred to as "GPC peak area ratio M") in a chart obtained by gel permeation chromatography (GPC). Specifically, the absorbance of the epoxy resin of interest is detected at a wavelength of 280 nm, and the content is calculated using the following equation based on the total area of all the detected peaks and the area of the peak corresponding to the monomer of the epoxy compound having a mesogenic structure.

GPC peak area ratio $M(\%)$=(area of the peak corresponding to the monomer of the epoxy compound having a mesogenic structure/total area of the peaks originated from the entire epoxy resin)×100

From the viewpoint of ease of handling, the GPC peak area ratio M is preferably 50% or less, more preferably 49% or less, and further preferably 48% or less. The GPC peak area ratio M of 50% or less tends to result in ease of handling since the viscosity easily drops when temperature is increased. The GPC peak area ratio M may be 5% or more, 10% or more, or 15% or more.

The content of the reaction product in the present disclosure having a branched structure with respect to the total amount of the epoxy resin is not particularly limited. For example, a reaction product having a branched structure in which, to a hydroxy group of a dimer of two molecules of compounds having a mesogenic structure linked via one molecule of a specific aromatic carboxylic acid, one or two molecules of the compound having a mesogenic structure have been further added, will be referred to as Reaction Product B. In this case, the total content of the Reaction Product B with respect to the total amount of the epoxy resin can be measured as a percentage (%) of the area of the peak originated from the Reaction Product B with respect to the total area of the peaks originated from the entire epoxy resin (hereinafter, this percentage is also referred to as "GPC peak area ratio B") in the chart obtained by GPC, similarly to the foregoing.

From the viewpoint of improving the viscosity stability, the GPC peak area ratio B may be 3% or more, 5% or more, or 7% or more. The GPC peak area ratio B may be 15% or less, 12% or less, or 10% or less.

The gel permeation chromatography is performed by using tetrahydrofuran as a mobile phase, at a sample concentration of 0.5% by mass and a flow rate of 1.0 ml/min. The measurement can be performed by using, for example, a high-speed liquid chromatograph L6000 from Hitachi, Ltd. and a data analyzer C-R4A from Shimadzu Corporation. For the column, for example, a GPC column such as a G2000HXL or a G3000 HXL from Tosoh Corporation can be used.

[Fracture Toughness of Cured Product]

The epoxy resin in the present disclosure preferably has a fracture toughness of 2.4 MPa·m$^{1/2}$ or more measured by three-point bend testing in accordance with ASTM D5045-14, when cured by 3,3'-diaminodiphenyl sulfone, which is a curing agent. The fracture toughness of the cured product will be described below.

[Liquid Crystal Structure of Cured Product]

The epoxy resin in the present disclosure preferably forms a higher-order structure in the cured product cured by 3,3'-diaminodiphenyl sulfone, which is a curing agent. In other words, it is preferable that an interference pattern due to depolarization is observed in an observation using a polarized light microscope under crossed Nicols.

<Epoxy Resin Composition and Epoxy Resin Cured Product>

The epoxy resin composition in the present disclosure includes the epoxy resin in the present disclosure and a curing agent. From the viewpoint of fracture toughness, the epoxy resin composition is preferably capable of forming a smectic structure or a nematic structure in the cured product.

The epoxy resin cured product is a cured product obtained by curing the epoxy resin composition in the present disclosure.

(Curing Agent)

The curing agent is not particularly limited as long as it is a compound capable of causing a curing reaction with an epoxy resin. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. One kind of curing agent may be used singly, or two or more kinds thereof may be used in combination.

From the viewpoint of forming a higher-order structure in a cured product of the epoxy resin composition, the curing agent is preferably an amine curing agent or a phenol curing agent, and more preferably an amine curing agent. The amine curing agent is preferably an amine curing agent having an aromatic ring and an amino group, more preferably an amine curing agent having an aromatic ring with an amino group directly bonded thereto, and further preferably an amine curing agent having an aromatic ring with two or more amino groups directly bonded thereto. Examples of the aromatic ring include a benzene ring and a naphthalene ring.

Specific examples of the amine curing agent include 3,3'-diaminodiphenyl sulfone, 4,4'-diaminodiphenyl sulfone, 4,4'-diaminodiphenylmethane, 4,4'-diaminodiphenyl ether, 4,4'-diamino-3,3'-dimethoxybiphenyl, 4,4'-diaminophenyl benzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide and trimethylene-bis-4-aminobenzoate.

From the viewpoint of forming a smectic structure in a cured product of the epoxy resin composition, the amine curing agent is preferably 3,3'-diaminodiphenyl sulfone, 4,4'-diaminodiphenyl sulfone, 1,3-diaminobenzene, 1,4-diaminobenzene, 4,4'-diaminobenzanilide, 1,5-diaminonaphthalene, 4,4'-diaminodiphenylmethane or trimethylene-bis-4-aminobenzoate. From the viewpoint of obtaining a cured product with low moisture absorption and high fracture toughness, 3,3'-diaminodiphenyl sulfone is more preferable.

Examples of the phenol curing agent include a low-molecular phenol compound, and a phenol novolac resin obtained by linking a low-molecular phenol compound with a methylene chain or the like to form a novolak. Examples of the low-molecular phenol compound include a monofunctional phenol compound, such as phenol, o-cresol, m-cresol or p-cresol; a bifunctional phenol compound, such as catechol, resorcinol or hydroquinone; and a trifunctional phenol compound, such as 1,2,3-trihydroxybenzene, 1,2,4-trihydroxybenzene or 1,3,5-trihydroxybenzene.

The content of the curing agent in the epoxy resin composition is not particularly limited. From the viewpoint of efficiency of the curing reaction, the content of the curing agent preferably satisfies a ratio of the number of equivalents of the functional group of the curing agent contained in the epoxy resin composition (in a case of an amine curing agent, the number of equivalents of the active hydrogen) to the number of equivalents of the epoxy group of the epoxy resin contained in the epoxy resin composition (number of equivalents of the functional group/number of equivalents of the epoxy group) of from 0.3 to 3.0, more preferably from 0.5 to 2.0.

(Other Component(s))

The epoxy resin composition may contain component(s) other than the epoxy resin and the curing agent as necessary. For example, the epoxy resin composition may contain a curing catalyst, a filler or the like. Specific examples of the curing catalyst include the compounds described above as examples of the reaction catalyst used for the synthesis of the epoxy resin in the present disclosure.

[Physical Properties of Epoxy Resin Cured Product]

[Fracture Toughness]

The cured product of the epoxy resin composition preferably has a fracture toughness of 2.4 MPa·m$^{1/2}$ or more. By the fracture toughness being 2.4 MPa·m$^{1/2}$ or more, sufficient strength tends to be obtained even when the epoxy resin cured product in the present disclosure is used for a CFRP. The fracture toughness value of the cured product can be measured by performing three-point bend testing in accordance with ASTM D5045-14. Specifically, the fracture toughness can be measured by the method described below in the Examples section.

[Flexural Modulus]

The cured product of the epoxy resin composition preferably has a flexural modulus of 2.0 GPa or more, more preferably 2.5 GPa or more, further preferably 2.6 GPa or more, and particularly preferably 2.7 GPa or more.

The flexural modulus of a cured product can be measured by three-point bend testing in accordance with JIS K7171 (2016).

[Glass Transition Temperature]

The glass transition temperature of the cured product of the epoxy resin composition is preferably 145° C. or higher, more preferably 150° C. or higher, and further preferably 155° C. or higher.

The glass transition temperature of the cured product can be measured, for example, as follows. Specifically, the cured product is cut into a strip shape to prepare a test piece, and subjected to a dynamic mechanical analysis in the tensile mode under the measurement conditions of a frequency of 10 Hz, a heating rate of 5° C./min, and a strain of 0.1%. The temperature corresponding to the maximum value of tan δ in a temperature-tan δ chart can be regarded as the glass transition temperature. For the evaluation equipment, for example, an RSA-G2 (TA Instruments) can be used.

[Use of Epoxy Resin Composition and Epoxy Resin Cured Product]

The use of the epoxy resin composition and the epoxy resin cured product is not particularly limited, and these can be suitably used for applications that require excellent fracture toughness. For example, the epoxy resin composition and the epoxy resin cured product may be suitably used for producing FRPs used for airplanes, spaceships or the like.

Further, in a case in which the epoxy resin in the present disclosure contains an epoxy compound having a branched structure, the epoxy resin composition can be suitably used in processing steps that require low viscosity and excellent flowability. For example, the epoxy resin composition can be suitably used in a processing method from which addition of solvent for lowering the viscosity is preferably omitted or in which the amount of solvent is preferably reduced from the viewpoint of suppressing the occurrence of voids in the cured product (e.g., production of FRPs used for airplanes, spaceships or the like). Further, the epoxy resin composition can be suitably used, for example, in the production of an FRP that involves impregnating fibers with an epoxy resin composition that is being heated, or in the production of a sheet-shaped product that involves spreading an epoxy resin composition that is being heated with a squeegee or the like.

<Composite Material>

A composite material in the present disclosure includes the epoxy resin cured product in the present disclosure and a reinforcing material.

The material of the reinforcing material included in the composite material is not particularly limited, and may be selected in accordance with, for example, the use of the composite material. Specific examples of the reinforcing material include a carbon material, glass, an aromatic polyamide resin such as Kevlar (registered trade name), ultra-high-molecular-weight polyethylene, alumina, boron nitride, aluminum nitride, mica and silica. The shape of the reinforcing material is not particularly limited, and examples thereof include fibers and particles (filler). From the viewpoint of the strength of the composite material, the reinforcing material is preferably a carbon material, and more preferably carbon fibers. The composite material may include one type of reinforcing material singly, or may include two or more types thereof in combination.

The form of the composite material is not particularly limited. Examples thereof include a composite material having a structure in which at least one cured product-containing layer that contains the epoxy resin cured product and at least one reinforcing material-containing layer that contains a reinforcing material are layered on one another.

EXAMPLES

Hereinafter, the foregoing embodiments will be described in detail by way of Examples. However, the embodiments are not limited to these Examples.

[Synthesis of Epoxy Resins]

The following materials were used for the synthesis of the epoxy resins.

—Epoxy Compound Having a Mesogenic Structure—
Epoxy Compound 1: trans-4-{4-(2,3-epoxypropoxy)phenyl}cyclohexyl=4-(2,3-epoxypropoxy)benzoate (epoxy equivalent weight: 227 g/eq)

—Modifying Agents—
4-hydroxybenzoic acid
Terephthalic acid
Isophthalic acid
6-hydroxy-2-naphthoic acid
2,6-naphthalenedicarboxylic acid
2,6-dihydroxynaphthalene
Hydroquinone
Resorcinol
4,4'-biphenol
4-hydroxycinnamic acid
4-hydroxypropionic acid —Reaction Catalyst—
A reaction adduct of tributylphosphine and hydroquinone 100 parts by mass of Epoxy Compound 1 were mixed with 160 parts by mass of cyclohexanone, and dehydrated under a reflux condition. Thereafter, a modifying agent shown in Tables 1 and 2 was added in an amount shown in Tables 1 and 2 and dissolved, followed by adding a reaction catalyst in an amount of 0.6% by mass with respect to the mass of the epoxy compound, and the mixture was heated for 3 hours under a reflux condition. Thereafter, the solvent was removed under a vacuum condition and a temperature condition of 170° C. at the highest, whereby an epoxy resin was obtained. The solid content of the epoxy resin synthesized in each of the Examples and Comparative Examples was 99.0% by mass or more.

Since a reaction adduct of tributylphosphine and hydroquinone was used as a reaction catalyst, the synthesized epoxy resins contain an epoxy compound having a branched structure.

[Measurement of the Epoxy Equivalent Weight]

The epoxy equivalent weight of the obtained epoxy resins was measured by perchloric acid titration.

[Evaluation of the Melt Viscosity]

The melt viscosity of the obtained epoxy resins was measured using a cone and plate viscometer (CAP2000, Brookfield). The measurement was performed at a temperature of 100±2° C. with a rotation speed of 50 rotations per speed (rpm) using a cone No. 5.

[Evaluation of the Fracture Toughness]

Each of the epoxy resins obtained in the Examples and Comparative Examples was mixed with a curing agent, which was 3,3'-diaminodiphenyl sulfone, at an equivalent ratio of 1:1. The mixture was placed in a stainless dish and heated to 180° C. on a hot plate, and subsequently subjected to a defoaming process at 150° C. under a vacuum condition. Thereafter, the resultant was heated at 150° C. for 4 hours in a furnace, whereby a cured product of the epoxy resin composition was obtained. The obtained cured product was cut out in a size of 3.75 mm×7.5 mm×33 mm to prepare a test piece for the evaluation of fracture toughness. The fracture toughness values (MPa·m$^{1/2}$) were calculated by performing three-point bend testing in accordance with ASTM D5045-14. For the evaluation equipment, an Instron 5948 (Instron) was used. The results are shown in Tables 1 and 2.

[Measurement of the Glass Transition Temperature]

Glass transition temperature (Tg) was used as an index of heat resistance of the epoxy resin cured products. The glass transition temperature of the test pieces was calculated by performing dynamic mechanical analysis in the tensile mode. The measurement was conducted under the conditions of a frequency of 10 Hz, a heating rate of 5° C./min, and a strain of 0.1%. The temperature corresponding to the maximum value of tan δ in the obtained temperature-tan δ chart was regarded as the glass transition temperature. As the evaluation equipment, an RSA-G2 (TA Instruments) was used. The results are shown in Tables 1 and 2.

[Observation of the Liquid Crystal Structure]

The epoxy resin cured products were ground to a thickness of 50 μm and were observed under crossed Nicols using a polarized light microscope (trade name: OPTIPHOT2-POL, manufactured by NIKON CORPORATION) to check the presence or absence of a liquid crystal structure. When the texture was able to be observed without appearing as the dark field, it was determined that a liquid crystal structure was formed.

Further, the presence or absence of a smectic structure or a nematic structure in the liquid crystal structure was checked by the following method. X-ray diffraction analysis was performed using an X-ray diffractometer (manufactured by Rigaku Corporation), using CuKα1 radiation at a tube voltage of 40 kV and a tube current of 20 mA in a range of 2θ=1° to 30°. When a diffraction peak was found in the range of 2θ=2° to 10°, it was determined that the liquid crystal structure contained a smectic structure. When the liquid crystal structure was contained while no smectic structure was contained, it was determined that the liquid crystal structure was a nematic structure.

The results are shown in Tables 1 and 2. In Tables 1 and 2, Sm indicates that a smectic structure was observed.

Moreover, the epoxy resins synthesized in Examples 1 and 4 had a low melt viscosity, and favorable ease of handling.

All documents, patent applications, and technical standards described in the present disclosure are herein incorporated by reference to the same extent as if each individual document, patent application, or technical standard was specifically and individually indicated to be incorporated by reference.

The invention claimed is:

1. An epoxy resin, comprising at least one compound selected from the group consisting of the following General Formulae (E1) and (E2):

TABLE 1

| Item | | | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|---|
| Composition for resin synthesis (values are based on parts by mass) | Epoxy compound | Epoxy Compound 1 | 100 | 100 | 100 | 100 | 100 | 100 | 100 | 100 |
| | Modifying agent | 4-hydroxybenzoic acid | 6.4 | | | | | | | |
| | | Terephthalic acid | | 7.3 | | | | | | |
| | | Isophthalic acid | | | 7.3 | | | | | |
| | | Hydroquinone | | | | 6.1 | | | | |
| | | Resorcinol | | | | | 6.1 | | | |
| | | 4,4'-biphenol | | | | | | 10.2 | | |
| | | 4-hydroxycinnamic acid | | | | | | | 7.2 | |
| | | 4-hydroxypropionic acid | | | | | | | | 7.3 |
| Properties of the resin | | Melt viscosity at 100° C. (Pa · s) | 5 | 25 | 35 | 4 | 5 | 5 | 4 | 3 |
| | | Epoxy equivalent weight (g/eq) | 340 | 340 | 340 | 330 | 330 | 370 | 320 | 330 |
| Properties of the cured product (cured at 150° C. for 4 hours) | | Fracture toughness (MPa · m$^{1/2}$) | 2.4 | 2.5 | 2.5 | 2.2 | 2.0 | 2.2 | 2.0 | 1.9 |
| | | Glass transition temperature (° C.) | 154 | 154 | 149 | 150 | 148 | 150 | 156 | 147 |
| | | Liquid crystal phase | Sm | Sm | Sm | Sm | Sm | Sm | Sm | Sm |

TABLE 2

| Item | | | Example 4 | Example 5 | Example 6 | Example 7 |
|---|---|---|---|---|---|---|
| Composition for resin synthesis (values are based on parts by mass) | Epoxy compound | Epoxy Compound 1 | 100 | 100 | 100 | 100 |
| | Modifying agent | 6-hydroxy-2-naphthoic acid | 7.9 | | | |
| | | 2,6-naphthalenedicarboxylic acid | | 9.5 | | |
| | | 2,6-dihydroxynaphthalene | | | 7.1 | |
| | | 4,4'-biphenol | | | | 10.2 |
| Properties of the resin | | Melt viscosity at 100° C. (Pa · s) | 5 | 45 | 5 | 5 |
| | | Epoxy equivalent weight (g/eq) | 335 | 345 | 330 | 370 |
| Properties of the cured product (cured at 150° C. for 4 hours) | | Fracture toughness (MPa · m$^{1/2}$) | 2.4 | 2.4 | 2.0 | 2.2 |
| | | Glass transition temperature (° C.) | 158 | 153 | 153 | 150 |
| | | Liquid crystal phase | Sm | Sm | Sm | Sm |

The Examples, in which an epoxy compound having a mesogenic structure and a specific aromatic carboxylic acid were used, showed excellent fracture toughness with a fracture toughness of 2.4 MPa·m$^{1/2}$ or higher.

Further, the cured product of Example 4, in which 6-hydroxy-2-naphthoic acid was used as a modifying agent for the epoxy compound, showed a significantly high glass transition temperature.

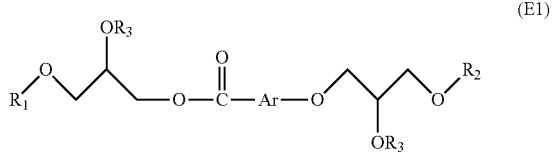

(E1)

-continued (E2)

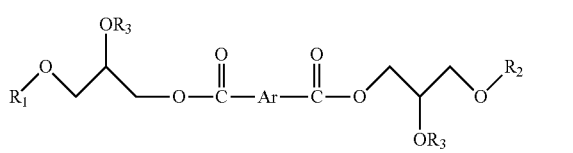

wherein, in General Formulae (E1) and (E2), Ar represents a substituted or unsubstituted aromatic ring; each of R1 and R2 independently represents a monovalent organic group having a glycidyl group, wherein at least one selected from the group consisting of $R_1$ and R2 includes a mesogenic structure; and each R3 independently represents a hydrogen atom or a monovalent organic group, at least one R3 being a monovalent organic group of the following Formula (c):

(c)

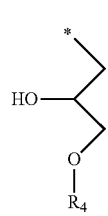

wherein, in Formula (c), $R_4$ represents a monovalent organic group; and * represents a bonding site to an oxygen atom.

2. The epoxy resin according to claim 1, wherein, in General Formulae (E1) and (E2), Ar represents a substituted or unsubstituted benzene ring or naphthalene ring.

3. The epoxy resin according to claim 1, wherein the mesogenic structure comprises a structure represented by the following General Formula (M):

(M)

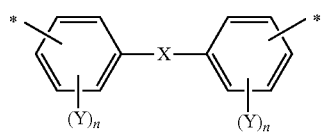

wherein, in General Formula (M), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom:

Group (A)

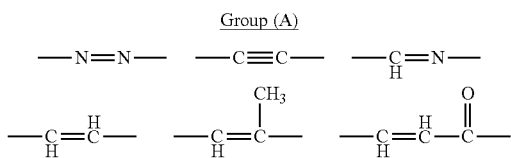

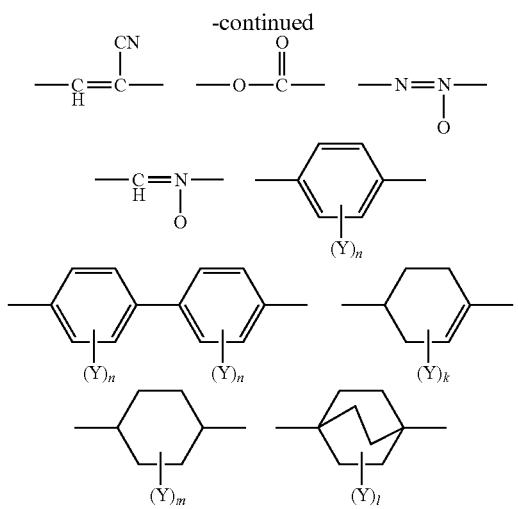

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4;

k represents an integer from 0 to 7; m represents an integer from 0 to 8; and l represents an integer from 0 to 12.

4. The epoxy resin according to claim 1, wherein the mesogenic structure comprises a structure represented by the following General Formula (M-2):

(M-2)

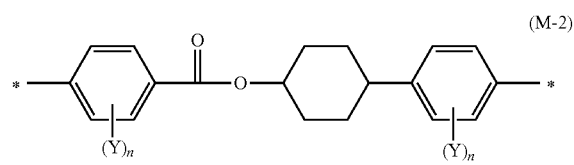

wherein, in General Formula (M-2), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; and * represents a bonding site to an adjacent atom.

5. The epoxy resin according to claim 1, having an epoxy equivalent weight of from 300 to 380 g/eq.

6. The epoxy resin according to claim 1, having a melt viscosity at 100° C. of 2.0 to 50.0 Pa·s.

7. The epoxy resin according to claim 1, wherein a cured product of the epoxy resin cured by 3,3'-diaminodiphenyl sulfone, which is a curing agent, has a fracture toughness of 2.4 MPa·m$^{1/2}$ or more measured by three-point bend testing in accordance with ASTM D5045-14.

8. The epoxy resin according to claim 1, wherein a cured product of the epoxy resin cured by 3,3'-diaminodiphenyl sulfone, which is a curing agent, shows an interference pattern due to depolarization, when the cured product is observed with a polarized light microscope under crossed Nicols.

9. An epoxy resin composition, comprising the epoxy resin according to claim 1 and a curing agent.

10. An epoxy resin cured product, which is a cured product of the epoxy resin composition according to claim 9.

11. A composite material comprising the epoxy resin cured product according to claim 10 and a reinforcing material.

* * * * *